United States Patent
Tokudome et al.

(10) Patent No.: US 8,512,855 B2
(45) Date of Patent: Aug. 20, 2013

(54) SELF-CLEANING MEMBER AND COATING COMPOSITION

(75) Inventors: Hiromasa Tokudome, Chigasaki (JP); Koji Okubo, Fujisawa (JP); Kyoko Kataoka, Chigasaki (JP); Saori Sonokawa, Chigasaki (JP); Hiroyuki Fujii, Chigasaki (JP)

(73) Assignee: Toto Ltd., Fukuoka-ken (JP)

( * ) Notice: Subject to any disclaimer, the term of this patent is extended or adjusted under 35 U.S.C. 154(b) by 0 days.

(21) Appl. No.: 12/455,394

(22) Filed: Jun. 1, 2009

(65) Prior Publication Data

US 2010/0304120 A1 Dec. 2, 2010

(51) Int. Cl.
*B32B 5/22* (2006.01)

(52) U.S. Cl.
USPC .............. 428/317.9; 428/315.5; 428/315.7; 523/175

(58) Field of Classification Search
USPC ................................ 428/317.9, 315.5, 315.7
See application file for complete search history.

(56) References Cited

U.S. PATENT DOCUMENTS

| | | | |
|---|---|---|---|
| 5,942,168 A * | 8/1999 | Ichikawa et al. | 264/40.1 |
| 2005/0084683 A1* | 4/2005 | Wynne | 428/421 |
| 2005/0277543 A1* | 12/2005 | Takahashi et al. | 502/100 |
| 2012/0142814 A1* | 6/2012 | Kanagasabapathy et al. | 523/175 |

FOREIGN PATENT DOCUMENTS

| | | |
|---|---|---|
| JP | 2002-371223 A | 12/2002 |
| JP | 2003-206434 A | 7/2003 |
| JP | 2004-143452 A | 5/2004 |
| JP | 2004-290794 A | 10/2004 |
| JP | 2004-346201 A | 12/2004 |
| JP | 2004-346202 A | 12/2004 |

* cited by examiner

*Primary Examiner* — Hai Vo
(74) *Attorney, Agent, or Firm* — Carrier Blackman & Associates, P.C.; William D. Blackman; Joseph P. Carrier

(57) ABSTRACT

A self-cleaning member comprising a member having a porous surface is disclosed. The member has a contact angle hysteresis $\Delta\theta$ (=$\theta a-\theta r$), which is a difference between an advancing contact angle $\theta a$ and a receding contact angle $\theta r$ measured by a dynamic contact angle measurement with an extension/contraction method, of 80 degree or more at the surface layer and a receding contact angle $\theta r$ of 25 degree or less, is capable of forming a water film on the surface by water provided and of allowing an ionic or reactive contaminant to be washed away without fixation.

20 Claims, 1 Drawing Sheet

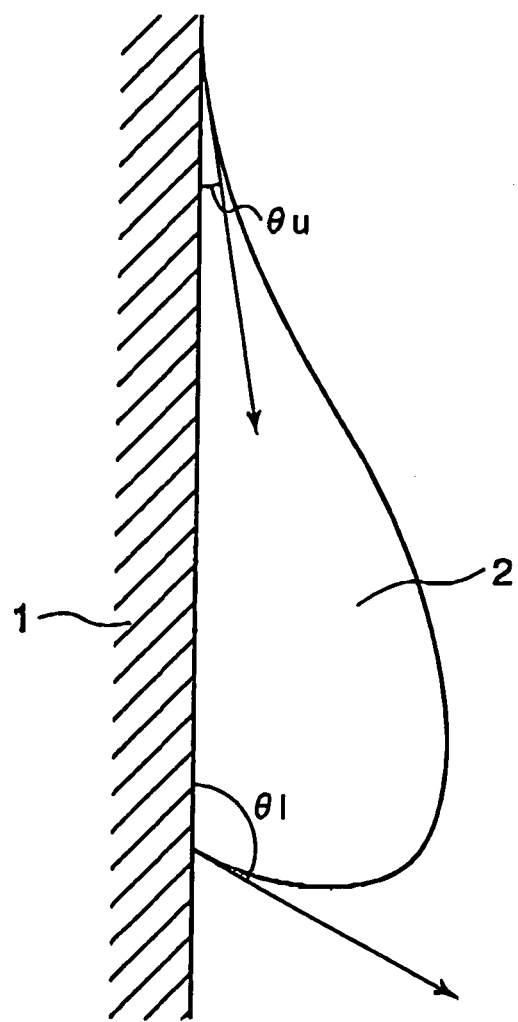

SELF-CLEANING MEMBER AND COATING COMPOSITION

BACKGROUND OF THE INVENTION

1. Field of the Invention

The present invention relates to a self-cleaning member and a coating composition.

2. Description of the Related Art

In recent years, how to prevent adhesion of taint is gaining considerable attention in dwelling space and outdoor environment. For example, worsening of living environment and esthetic appearance due to oils and microorganisms such as fungi and algae in the indoor environment, and worsening of esthetic appearance due to the adhesion of taint on the exterior of architecture caused by environmental pollution and the like in the outdoor environment are posing problems. Among these, in the architectural exterior field, taint on the surface of the architectural exterior materials and outdoor construction are posing problems in association with the environmental pollution. Soot and particles suspended in the air deposit on the roof and exterior of the buildings in fine weather. The deposit is carried away by rainwater when it rains and flows down the exterior of buildings. Furthermore, soot suspended in the air is captured by rain and the rain which captures the soot flows down the exterior of buildings and surface of the outdoor construction. As a result, contaminants adhere on the surface along the pass of the rainwater and a streaky taint appear on the surface when such a surface is dried.

Furthermore, the exterior wall of tall buildings becomes tainted by hydrophobic taints such as soot in the air, combustion products such as exhaust gas, taints eluted from the sealant located above and contaminants ejected from the exhaust vent of buildings. These hydrophobic taints are dark-colored and extremely defile the esthetic appearance of buildings. Taints on the architectural exterior material and coated films are considered to be composed of combustion products such as carbon black and inorganic contaminants such as urban soot and clay particles (For example, refer to Journal of Structural and Construction Engineering, Vol. 404. p. 15-24, October 1989, Architectural Institute of Japan).

According to the conventionally accepted idea, a water-repellent paint such as polytetrafluoroethylene (PTFE) was considered to be preferable to prevent the aforementioned taints on architectural exterior and the like. However, since such painted surface tends to get tainted in the shape of the rain flow streaks, it is considered recently that the surface of the coated film should be as hydrophilic as possible against the urban soot which contains hydrophobic components in a large amount (For example, refer to Monthly Functional Materials (Gekkan Kinou Zairyou), Vol. 44, p. 47, August 2005, CMC Publishing Co., Ltd.).

Under these circumstances, there has been recently known a technique to make the surface of the coated film hydrophilic after application by adding a hydrophilic component such as a hydrophilic graft polymer, acrylic silicone, etc. to a coating material. Such coated film exhibits the hydrophilicity of 20 to 60 degree in terms of contact angle of water.

However, since the inorganic dust represented by clay mineral has a contact angle of water of 20 to 50 degree and has an affinity for the aforementioned hydrophilic component that has a contact angle of water of 20 to 60 degree, resulting in the tendency to adhere to the surface, and thus the coated film of the graft polymer cannot prevent taints by the inorganic dust. In addition, it is considered that, on the surface of the coated film with a contact angle of 20 to 60 degree, water drops adhering on the surface by rainfall and the like do not form a uniform water film but are likely to remain on the surface as tiny droplets to which taint components tend to adhere and remain as taints, resulting in spoiling the esthetic appearance. As an antifouling technology to prevent the aforementioned various causes of contamination as well as the contamination by the adhesion of microorganisms such as fungi and algae, there are proposals to make the surface superhydrophilic with a contact angle of water of 20 degree or less. Among these, there is gaining attention a technique to provide an environmentally preferred approach by coating the architectural exterior with a photocatalytic material and by imparting the coated surface with a self-cleaning function by rainfall and a function to decompose harmful gases such as NOx, wherein the coated surface is made hydrophilic by irradiation of sunlight (For example, refer to Japanese Patent Laid-Open Publication No, 2003-342526 and No. 2004-143452).

SUMMARY OF THE INVENTION

It is an object of the present invention to provide a self-cleaning member capable of easily washing away the deposit or contaminant having various properties which adhered on the surface by merely exposing it to rainfall or water stream.

The inventors have currently found that the deposit or contaminant adhering on the surface can be easily washed away by merely exposing it to rainfall or water stream, by providing a surface having a contact angle hysteresis $\Delta\theta$ ($=\theta a-\theta r$), which is a difference between an advancing contact angle $\theta a$ and a receding contact angle $\theta r$ measured by a dynamic contact angle measurement with an extension/contraction method, of 80 degree or more and a receding contact angle $\theta r$ of 25 degree or less. Particularly, it was surprisingly found that, not only the hydrophobic deposit or contaminant, but also reactive contaminants such as iron ion generated by corrosion of iron, silicate contained in the rainfall and a component contained in silicone sealant which reacts with and firmly adheres on the substrate to cause defective appearance can be prevented from adsorption to the surface and can be easily washed away together with the water film formed by merely exposing them to rainfall or water stream.

That is, the self-cleaning member according to the present invention comprises a member having a porous surface, wherein the surface layer has a contact angle hysteresis $\Delta\theta$ ($=\theta a-\theta r$), which is a difference between an advancing contact angle $\theta a$ and a receding contact angle $\theta r$ measured by dynamic contact angle measurement by an extension/contraction method, of 80 degree or more and a receding contact angle of 25 degree or less, and is capable of forming a water film on the surface by water provided and of allowing an ionic or reactive contaminant to be washed away without fixation.

The surface of the self-cleaning member according to one aspect of the present invention has a static contact angle of water of 80 degree to 130 degree. In addition, the self-cleaning member according to one embodiment of the present invention comprises a porous surface with the opening pore diameter of 10 nm or more and 30 μm or less.

The coating composition for forming the self-cleaning member according to the present invention comprises hydrophobic resin emulsion particles, whiskers and a dispersant. The self-cleaning coating composition according to one embodiment of the present invention is a coating composition containing at least hydrophobic resin emulsion particles, whiskers, photocatalyst particles and water, wherein the coating composition has a weight ratio of the hydrophobic resin emulsion particles to the whiskers of 2 or more and 5.5 or less, and wherein the coating composition has a ratio of a sum of the solid weight of the hydrophobic resin emulsion particles and the whiskers to the total solid weight of the coating composition of 0.4 or more and 1.0 or less.

The self-cleaning member according to one embodiment of the present invention comprises a substrate and a coating layer provided on or above the substrate, the coating layer being provided by applying the aforementioned coating composition.

BRIEF DESCRIPTION OF THE DRAWING

FIG. 1 is a schematic diagram of a water drop which adhered on the surface of the self-cleaning member of the present invention.

DETAILED DESCRIPTION OF THE INVENTION

Definition

In this invention, "porous surface" is a surface having independent openings with the opening ratio of 5% or more and 75% or less. As used herein, the opening ratio is a value calculated by the image analysis utilizing a contrast ratio of a scanning electron microscopic image at a magnification of 5,000 to 100,000. "Opening diameter" is a measured value of long axis of an independent opening by the image analysis utilizing a contrast ratio of a scanning electron microscopic image at a magnification of 5,000 to 100,000.

In the present invention, "contact angle hysteresis" is defined as a difference $\Delta\theta$ (=$\theta a-\theta r$) between the advancing contact angle $\theta a$ and the receding contact angle $\theta r$ in the dynamic contact angle measurement with an extension/contraction method. In the present invention, the advancing contact angle $\theta a$ and the receding contact angle $\theta r$ are determined by the dynamic contact angle measurement with an extension/contraction method. "Dynamic contact angle" is known as a dynamic change of the contact angle supposing a situation in which liquid moves on the solid surface such as in washing and applying. Usually, the contact angle when the interface of a liquid drop advances is defined as the advancing contact angle $\theta a$ and the contact angle when the interface recedes is defined as the receding contact angle $\theta r$. The detail of this definition is disclosed in "Basics and Application of Wetting", Realize Science & Engineering Center Co., Ltd., 1992, the disclosure of which is incorporated herein by reference as a part of the disclosure of the present specification. According to the "extension/contraction method", the advancing contact angle can be defined as the contact angle of the advancing water drop when a certain amount of water is injected into a liquid drop contacting with the solid surface by stabbing it with a tip of a needle of a syringe. The receding contact angle can be defined as the contact angle of the receding water drop when water is withdrawn from the water drop after injection of a certain amount.

The dynamic contact angle by the extension/contraction method in the present invention can be measured by, for example, an automatic contact angle measuring instrument (OCA20) manufactured by Eko Instruments Co., Ltd. Specifically, first using the aforementioned automatic contact angle-measuring instrument, a water drop is formed by placing 0.1 µL of distilled water on the sample. Then the central part of the water drop is stabbed with a stainless steel needle with outer diameter of 0.21 mm and inner bore diameter of 0.11 mm (SNS021/011 manufactured by Eko Instruments Co., Ltd.) attached to a glass syringe for 500 µL (DS500/GT manufactured by Eko Instruments Co., Ltd.), so that the height of the needle tip is 0.2 mm from the sample surface. Then the contact angle immediately after injecting 40 µL of distilled water from the needle at a flow rate of 20 µL/s is taken as the advancing contact angle and, after leaving still for 1 second, the contact angle immediately after withdrawing 40 µL at a flow rate of 20 µL/s is taken as the receding contact angle.

"Self-cleaning property" in the present invention is referred to as the characteristics that exhibit low adsorptive property not only for hydrophobic contaminants such as soot and granular contaminants such as inorganic dust which adhered to the surface, but also for ionic contaminants such as iron ion and reactive contaminants such as those generated from water stain and silicone sealant each time these contaminants receive rainfall or water stream and that maintain the surface cleanliness almost permanently by allowing the contaminants to be easily washed away by rainfall or water stream. In addition, the reactive contaminants refer to the contaminants that chemically bond to the member surface and are difficult to be removed. Specific examples are silicic acid, silicate and alkoxysilane in the silicone sealant and the like.

Self-Cleaning Member

The surface of the self-cleaning member according to the present invention has a contact angle hysteresis $\Delta\theta$ (=$\theta a-\theta r$), which is a difference between the advancing contact angle $\theta a$ and the receding contact angle $\theta r$ measured by the dynamic contact angle measurement with an extension/contraction method, of 80 degree or more and a receding contact angle $\theta r$ of 25 degree or less. This makes it possible to easily wash away the deposit or contaminants which adhered on the surface by merely exposing them to rainfall or water stream. Especially with the self-cleaning member of the present invention, since the surface adsorptivity is low, not only for the hydrophobic deposits and contaminants for which the conventional hydrophilic surface is suitable, but also for the ionic contaminants and reactive contaminants for which the hydrophilic surface is not suitable, the surface cleanliness can be maintained for a long time period by merely exposing them to rainfall or water stream. Therefore, the self-cleaning member of the present invention is suitable for the application to the architectural materials for exterior walls. As the especially expectable application, exemplified are locations where steel material is exposed and there are problems of release of iron ion and fixing of released products to the surface, panel seams and peripheral parts of window frames treated with silicone sealing, etc.

Although the mechanism in which good self-cleaning property is exhibited when the surface contact angle hysteresis is 80 degree or more and the receding contact angle $\theta r$ is 25 degree or less as mentioned above is not clear, it is approximately considered as follows. It is needless to say, however, that the explanation mentioned below is only a hypothesis and the present invention should not be limited by the following explanation. First of all, as is clear from the aforementioned definition, on the surface where the contact angle hysteresis is 80 degree or more, when a water drop adheres from outside, the difference between the advancing contact angle and the receding contact angle becomes large. This means that, on a vertically or obliquely disposed surface, the water drop which adhered can maintain the drop state with a high retaining force, that is, the water drop is not likely to flow down until it grows to a certain size. FIG. 1 schematically represents the water drop in this state. In FIG. 1, the surface 1 is disposed vertically. The water contact angle $\theta u$ is small at the upper side of the water drop 2 and the water contact angle $\theta l$ is large at the lower side of the water drop 2. That is, the water drop is shown so that the difference ($\theta l-\theta u$) becomes large, because it is considered that the water contact angle $\theta u$ at the upper side of the drop can be discussed by replacing it with the receding contact angle θr, since the interface of the drop tends to recede by downward movement of water due to its own weight at the upper portion of the drop, while the water contact angle θl at the lower side of the drop can be discussed by replacing it with the advancing contact angle θa, since the interface of the drop tends to advance by the downward water supply due to its own weight at the lower portion of the drop. And in this way, if the water contact angle θu is small at the upper side of the drop and the water contact angle θl is large at the lower side of the drop, the water accumulating at the lower side enlarges due to its large water contact angle, while the upper thin portion spreads over the surface to draw the drop to the surface with a large contact area.

As a result, a phenomenon occurs in which the water drop, after sustaining without flowing down until it grows to a certain size, flows down on the surface at once as an enlarged drop, unable to bear its own weight. In other words, it can be said that the water drop would rather tend to spread on the surface than fall down as tiny droplets in this phenomenon. And it is considered that, if this microscopic phenomenon is observed macroscopically, a state may occur as if a uniform water film were formed on the surface, because the gradually growing water drops can continuously fall down by coalescing with each other, when water drops are supplied to the surface continuously by rainfall or water washing from outside. This state would be expressed as dynamic hydrophilicity. Since the grown water drops or water film larger than usual are formed through such a phenomenon, it is considered that the contaminated water which has taken up the taint of the surface by elution or dispersion in the process of growth of the water drop which adhered on the surface is replaced at once by freshly supplied water and is washed away. And it is considered that, under this phenomenon, since the surface is originally water repellent statically in the process of growth of the water drop which adhered on the surface, adsorption of contaminant such as iron ion which firmly adheres on the hydrophilic surface is also restrained and that, since sufficient time can be secured for the contaminant to be gradually eluted, not only the hydrophobic deposit or contaminant, but also the ionic contaminant can be easily washed away by merely exposing them to rainfall or water stream.

Therefore, it is considered that, since the receding contact angle θr on the aforementioned surface measured by the dynamic contact angle measurement with an extension/contraction method is 25 degree or less, the upper thin portion of the attached water drop shown in FIG. 1 can sufficiently spread over the surface to draw the growing drop strongly to the surface with a large contact area, resulting in exhibiting the self-cleaning property more effectively.

According to a more preferred embodiment of the present invention, it is preferable that the self-cleaning member maintains a state in which the contact angle hysteresis Δθ is 80 degree or more and the receding contact angle θr is 25 degree or less, even after a 6-month outdoor exposure. This makes it possible to sustain an excellent weather resistance and excellent antifouling property for a long time. In the present invention, as for the "6-month outdoor exposure", the acceleration test for 150 hours based on JIS K 5400 9.8 "Accelerated weathering test-Sunshine carbon-arc type weathering test" can be considered equivalent to a 6-month exposure.

Self-Cleaning Member Surface

The material and microstructure of the surface of the present invention are not particularly limited as long as it is constructed from the material which can realize the contact angle hysteresis Δθ (=θa−θr) of 80 degree or more.

According to a preferred embodiment of the present invention, the high water-drop retention capability at the surface due to the contact angle hysteresis of 80 degree or more is realized at the porous surface having openings with the opening diameter of 0.01 µm to 30 µm. It is considered that this is because water drops would rather tend to accumulate and spread over the surface than falling down as tiny droplets as they are, since water drops are trapped in the fine pores on the porous surface.

As the means to realize the self-cleaning surface, there are embodiment 1 in which a coating composition is applied to the substrate surface to form a coating layer, embodiment 2 in which the porous surface formed by anodic oxidation is subjected to water repellent treatment, and other embodiments.

Embodiment 1: Realization of Self-Cleaning Surface by Coating Composition. Paint According to a more preferred embodiment of the present invention, it is preferable that the surface of the coating layer of the self-cleaning member is porous, and such porous surface is preferably formed by the fine pores of a diameter of about 5 µm to about 30 µm with the density of 200 pores/mm$^2$ or more. With such pore size and number density, the self-cleaning property by the enlarged water drops falling down the surface at once can be more effectively exhibited, because water easily infiltrates into the fine pores and the water drops are strongly trapped in the fine pores on the porous surface. Such pore size and number density can be measured by the particle (circle) shape analysis function of a laser microscope.

According to a preferred embodiment of the present invention, it is preferable that the surface comprises a hydrophobic substance as a matrix. This makes it possible to contribute to the aforementioned dynamic hydrophilicity that is realized at the surface by the contact angle hysteresis of 80 degree or more, while securing the conventionally known antifouling function due to the water repellent surface by imparting the static hydrophobicity to the surface. Specifically, since the static water repellency imparted to the surface enhances the tendency of the water drop which adhered not to fall down until it grows to a certain size by an interaction with the pore on the surface, self-cleaning property to various taints can be improved. Furthermore, since the surface is hydrophobic, it is possible to weaken the interaction with the ionic contaminants contained in iron rust and the like and easily soluble in water, and to improve the self-cleaning property against these taints by water stream. According to a preferred embodiment of the present invention, it is preferable that a contact angle of water of 80 to 130 degree is imparted to the surface of the coating layer by the addition of a hydrophobic substance.

Although any substance may be used as the hydrophobic substance as long as it shows hydrophobicity, it is preferable that the hydrophobic resin is used, the example of which are an acrylic resin, a urethane resin, a styrene resin, an epoxy resin, a silicone resin, a fluorine resin and their combination. More preferably, more hydrophobic silicone resin, fluorine resin and their combination are exemplified. It is preferable that such a hydrophobic resin is provided to the substrate surface in a form of hydrophobic resin emulsion particles and cured by drying or heating. "Hydrophobic resin emulsion particles" in the present invention represent particulate matters of the partially or completely polymerized hydrophobic resin that are stably dispersed in an emulsion state, containing an emulsifier in some cases, in a dispersant such as mainly water. As such hydrophobic resin emulsion particles, it is preferable that at least one kind selected from, for example, fluorine resin emulsion particles and silicone emulsion particles, or their mixture is used.

Although the silicone resin emulsion particles utilizable as the hydrophobic resin are not at all limited and may be produced by any production method, those produced by the following production methods can be preferably utilized.

(1) A method to emulsify an alkoxysilane compound or its partially hydrolyzed and condensed product using various surfactants to make an aqueous emulsion (for example, refer to Japanese Patent Laid-Open Publication No. H3-200793).

(2) A method to make an emulsion by forcibly and mechanically pulverizing and dispersing a solid silicone resin with a linear silicone compound without a solvent (for example, refer to Japanese Patent Laid-Open Publication No. H7-247434).

(3) A method to emulsion-polymerize a radically polymerizable vinyl monomer in the presence of a water-soluble polymer obtained by hydrolyzing an alkoxysilane in water without using a surfactant (for example, refer to Japanese Patent Laid-Open Publication No. H8-60098).

(4) A method to obtain graft copolymer fine particle (solid) emulsion by hydrolysis and condensation of an alkoxysilane mixture containing a vinyl polymerizable alkoxysilane to make an aqueous emulsion containing a solid silicone resin, followed by addition of a radical polymerizable vinyl monomer and performing emulsion polymerization (for example, refer to Japanese Patent Laid-Open Publication No. H7-196750).

(5) A method to introduce a silicone resin into emulsion particles by adding an alkoxysilane to an emulsion obtained by emulsion polymerization of a radical polymerizable functional group followed by hydrolysis and condensation (for example, refer to Japanese Patent Laid-Open Publication No. H8-3409).

(6) A method to make an emulsion by emulsion polymerization of a vinyl polymerizable functional group-containing alkoxysilane with a radical polymerizable vinyl monomer (for example, refer to Japanese Patent Laid-Open Publication No. H8-27347).

Preferred examples of the raw material monomers used for producing silicone resin emulsion include methyltrimethoxysilane, methyltriethoxysilane, methyltrichlorosilane, methyltribromosilane, methyltriisopropoxysilane, methyltri-t-butoxysilane, ethyltrimethoxysilane, ethyltriethoxysilane, ethyltrichlorosilane, ethyltribromosilane, ethyltriisopropoxysilane, ethyltri-t-butoxysilane, n-propyltrimethoxysilane, n-propyltriethoxysilane, n-propyltrichlorosilane, n-propyltribromosilane, n-propyltriisopropoxysilane, n-propyltri-t-butoxysilane, n-hexyltrimethoxysilane, n-hexyltriethoxysilane, n-hexyltrichlorosilane, n-hexyltribromosilane, n-hexyltriisopropoxysilane, n-hexyl-t-butoxysilane, n-decyltrimethoxysilane, n-decyltriethoxysilane, n-decyltrichlorosilane, n-decyltribromosilane, n-decyltriisopropoxysilane, n-decyltri-t-butoxysilane, n-octatrimethoxysilane, n-octatriethoxysilane, n-octatrichlorosilane, n-octatribromosilane, n-octatriisopropoxysilane, n-octatri-t-butoxysilane, phenyltrimethoxysilane, phenyltriethoxysilane, phenyltrichlorosilane, phenyltribromosilane, phenyltriisopropoxysilane, phenyltri-t-butoxysilane, dimethyldichlorosilane, dimethyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosilane, phenylmethyldibromosilane, phenylmethyldimethoxysilane, phenylmethyldiethoxysilane, vinyltrichlorosilane, vinylbromosilane, vinyltrimethoxysilane, vinyltriethoxysilane, vinyltriisopropoxysilane, vinyltri-t-butoxysilane, trifluoropropyltrichlorosilane, trifluoropropyltridibromosilane, trifluoropropyltrimethoxysilane, trifluoropropyltriethoxysilane, vinyltrichlorosilane, trifluoropropyltriisopropoxysilane, trifluoropropyltri-t-butoxysilane, γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyl-t-butoxysilane, γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-methacryloxypropyltriisopropoxysilane, γ-methacryloxypropyltri-t-butoxysilane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminomethacryloxypropyltri-t-butoxysilane, γ-methylcaptopropylmethyldimethoxysilane, γ-methylcaptopropylmethyldiethoxysilane, γ-methylcaptopropyltrimethoxysilane, γ-methylcaptopropyltriethoxysilane, γ-methylcaptopropyltriisopropoxysilane, γ-methylcaptopropyltri-t-butoxysilane, β-(3,4-epoxycyclohexyl)ethyltrimethoxysilane, β-(3,4-epoxycyclohexyl)ethyltriethoxysilane and the like. And, as the silicone resin emulsion, the emulsified dispersion obtained by hydrolysis or polymerization with partial hydrolysis of the aforementioned silane compound monomers according to the aforementioned production method can be preferably utilized.

The fluorine resin emulsion particles utilizable as the hydrophobic resin are not at all limited and may be produced by any production method. They may be produced by various methods including, for example, solution polymerization, bulk polymerization, suspension polymerization, or emulsion polymerization and the like based on the polymerization mechanism of radical polymerization, cationic polymerization or anionic polymerization. In addition, random, alternative and block copolymers based on the aforementioned polymerization mechanism and block, graft and star-type polymers with the molecular weight distribution controlled by applying various living polymerization methods or polymer reaction may be optionally selected. In addition, it is also possible to modify the polymer by various polymer reactions, methods applying energy beam such as radiation, electron beam, ultraviolet light, etc. and the like after obtaining such polymers. Preferred examples of fluorine resin emulsion include emulsion particles of polymers containing, a fluoro group such as polytetrafluoroethylene, polyvinylidene fluoride, polyvinyl fluoride, polychlorotrifluoroethylene, tetrafluoroethylene-hexafluoropropylene copolymer, ethylene-tetrafluoroethylene copolymer, ethylene-chlorotrifluoroethylene copolymer, tetrafluoroethylene-perfluoroalkyl vinyl ether copolymer, perfluorocyclopolymer, vinyl ether-fluoroolefin copolymer, vinyl ester-fluoroolefin copolymer, tetrafluoroethylene-vinyl ether copolymer, chlorotrifluoroethylene-vinyl ether copolymer, tetrafluoroethylene urethane crosslinked product, tetrafluoroethylene epoxy crosslinked product, tetrafluoroethylene acrylic crosslinked product, tetrafluoroethylene melamine crosslinked product, and the like.

According to a preferred embodiment of the present invention, it is preferable that the average particle diameter of the hydrophobic resin emulsion particles is 80 nm to 2,000 nm, more preferably 80 nm to 1,000 nm, further more preferably 100 nm to 1,000 nm. This makes it possible to effectively form the crosslinked structure and to prevent the surface irregularity and fine pores from becoming too small, resulting in securing sufficient porosity and improving antifouling property. For example, in a preferred embodiment in which whiskers to be described below are used in combination, if the average particle diameter of the hydrophobic emulsion is 80 nm to 2,000 nm, the particles can be rapidly adsorbed around the whiskers to form the crosslinked structure. Especially in the range of 100 nm to 1,000 nm, the particles can be adsorbed on the whiskers most effectively to form the crosslinked structure. In addition, the average particle diameter of the hydrophobic resin emulsion particles of the present invention can be measured using a concentrated solution type particle size distribution analyzer utilizing the dynamic light scattering method (FPAR-1000 manufactured by Otsuka Electronics Co., Ltd.). As the measurement method of the average particle diameter of the present invention, for example, regarding the emulsion dispersion adjusted at the solid content of 10 weight %, the cumulant average particle diameter (hydrodynamic diameter) obtained by setting a secondary autocorrelation function which can be directly calculated from the time course of the scattering intensity is used as the average particle diameter. Note that the average particle diameter of the hydrophobic resin emulsion particles of the present invention is calculated as the diameter including the emulsifier layer, when the emulsifier is contained as the nature of the emulsion.

According to a preferred embodiment of the present invention, it is more preferable that the coating layer further comprises whiskers. This makes it possible to effectively form numerous fine pores which have openings on the surface of the coating layer and to improve the self-cleaning property. "Whiskers" in the present invention are rods, fibers and the like which have an aspect ratio defined with a minor axis and a major axis. According to an especially preferred embodiment of the present invention, it is preferable that the whiskers are used in combination with the hydrophobic resin, i.e., the coating layer contains the hydrophobic resin and whiskers. It is considered that, since the aforementioned hydrophobic resin (the hydrophobic emulsion resin particles before curing) acts as a fixing linker for the whiskers, the porous structure including irregularities is formed on the composite surface and, when rain water in the case of rainfall or water drops in the case of water washing are supplied from outside, water can easily flow in and out in the vicinity of the composite surface. By virtue of this unique action, the surface can have characteristics of having a high affinity for water regardless of its hydrophobicity and, since the adhesion strength with water at the interface is large, the contact angle hysteresis is large. Because of these excellent surface characteristics, the hydrophobic adhesive deposit or contaminants which adhered to the composite surface can be easily washed away. In addition, since the composite surface can be made hydrophobic by using the hydrophobic resin emulsion particles as a linker, the interaction with the ionic contaminants contained in iron rust and the like is weakened and they can be easily washed away by water drops supplied from outside as mentioned above. In the present invention, the adhesive deposits and/or contaminants on the member having the surface with the aforementioned contact angle hysteresis can be washed away by raindrops when the surface is exposed to water addition by rainfall or water washing for a long time. In addition, the surface can be easily washed by water and cleaned by water rinsing or simple water wiping.

As the whiskers utilizable in the present invention, those which form a structure by binding with the hydrophobic resin emulsion particles may be used. Preferred examples are metal oxide whiskers, metallic acid salt whiskers, and mixture thereof. More preferred examples are, in view of expectation of high weather resistance of the composite material, inorganic whiskers such as potassium titanate ($K_2Ti_4O_9$, $K_2Ti_8O_{17}$, etc.), calcium carbonate, sepiolite, wollastonite, titanium oxide (rutile-type, $TiO_2$—B, etc.), zinc oxide, aluminum borate, etc., more preferably potassium titanate whiskers, aluminum borate whiskers, calcium carbonate whiskers and titanium oxide whiskers.

According to a preferred embodiment of the present invention, it is preferable that the aspect ratio represented by the average minor axis/average major axis of the whisker is 5 to 100, more preferably 10 to 50. According to this embodiment, three-dimensional crosslink structure is effectively formed without a problem of occurrence of crack and the like and the surface irregularity and narrowing of the pores due to too many emulsion particles adsorbed on one whisker can be prevented, resulting in the improved self-cleaning property. In addition, the minor axis and major axis of the whiskers of the present invention can be obtained by observing 50 whiskers within a visual field of a scanning electron microscope (S-4100 manufactured by Hitachi, Ltd.) with a magnification of 1,000 and calculating the average value of the minor axis and major axis of the whiskers.

According to a preferred embodiment of the present invention, it is preferable that the minor axis of the whisker is 50 nm to 2,000 nm, more preferably 100 nm to 1,000 nm. According to this embodiment, imperfect formation of the crosslink structure due to too few emulsion particles adsorbed on one whisker particle, as well as narrowing of the surface irregularity in the crosslink structure and the pores due to too many emulsion particles which adhere to one whisker particle, can be prevented, resulting in the improved self-cleaning property.

According to a preferred embodiment of the present invention, it is preferable that the ratio of the average minor axis to the average particle diameter of the hydorophobic resin emulsion particle is 0.1 to 5. According to this embodiment, imperfect formation of the crosslink structure due to too few emulsion particles adsorbed on one whisker particle, as well as narrowing of the surface irregularity in the crosslink structure and the pores due to too many emulsion particles which adhere to one whisker particle, can be prevented, resulting in the improved self-cleaning property.

According to a preferred embodiment of the present invention, it is preferable that the weight ratio of the hydrophobic resin to the whisker is 2 or more and 5.5 or less, more preferably 2 or more and 5 or less, further more preferably 2 or more and 4 or less. Such weight ratio can be easily realized by using the coating composition with the solid weight ratio of the whisker to the hydrophobic resin emulsion particles adjusted in the aforementioned range when the coating layer is formed. In addition, in this specification, "solid weight" represents the heating residue weight of the solid remaining after heating at 150° C. for 5 hours and "solid weight ratio" represents their ratio. According to this embodiment, narrowing of the surface irregularity can be prevented thanks to the easiness of three-dimensional crosslinking of the hydrophobic resin emulsion particles and the whiskers, and the relative decrease of the contact angle hysteresis due to the decrease of the advancing contact angle can be prevented by securing the hydrophobicity of the member surface. In addition, narrowing of irregularity in the crosslink structure and the pores due to too large fraction of the hydrophobic resin emulsion particles at the member surface can also be prevented. As a result, it is possible to suitably increase the surface irregularity and the pores by the crosslink structure of the hydrophobic resin emulsion particles and whiskers, resulting in improvement of the self-cleaning property.

According to a preferred embodiment of the present invention, it is preferable that the ratio of the weight of the whiskers and the hydrophobic resin to the total weight of the coating layer is 0.1 or more and 1 or less, preferably 0.3 or more and 1.0 or less, further more preferably 0.4 or more and 1.0 or less. Such weight ratio can be easily realized by using the coating composition prepared with the ratio of the total weight of the whiskers and the hydrophobic resin emulsion particles to the solid weight of the coating composition adjusted in the aforementioned range. According to this embodiment, the fraction of the whiskers and the hydrophobic resin emulsion present in the surface can be sufficiently increased, resulting in the improved self-cleaning property.

According to a preferred embodiment of the present invention, the surface can further contain photocatalyst particles. Examples of the preferred photocatalyst particles include anatase-type titanium oxide, rutile-type titanium oxide, zinc oxide, tin oxide, ferric oxide, dibismuth trioxide, tungsten trioxide, strontium titanate, and combination thereof. According to a preferred embodiment of the present invention, the weight ratio of the photocatalyst particles to the total weight of the coating layer may be 0.001 to 0.1. According to a preferred embodiment of the present invention, the coating layer may contain the photocatalyst particles. By having the self-cleaning composite material of the present invention complementarily contain the photocatalyst particles, removal of contaminants due to the ability to decompose organic substances and the ability to decompose harmful gases such as NOx by the photocatalyst particles under the irradiation environment of sunlight or artificial light, as well as further improvement of antifouling property of the self-cleaning member of the present invention, can be expected. As the photocatalyst particles of the present invention, for example, particles such as titanium oxide, zinc oxide, tin oxide, iron oxide, zirconium oxide, tungsten trioxide, chromium oxide, molybdenum oxide, ruthenium oxide, germanium oxide, lead oxide, cadmium oxide, copper oxide, vanadium oxide, niobium oxide, tantalum oxide, manganese oxide, rhodium oxide, ferric oxide, nickel oxide, dibismuth trioxide, rhenium oxide, strontium titanate and the like can be utilized. When titanium oxide is used as the photocatalyst, it is preferable to use the crystalline type of anatase, rutile or brookite, since the photocatalytic activity is the strongest and is exhibited for a long time. In addition, particles designed to respond to visible light by doping a different element into the crystal structure of titanium dioxide can be used. As the element to be doped to titanium oxide, anionic element such as nitrogen, sulfur, carbon, fluorine, phosphorus, etc. and cationic element such as chromium, iron, cobalt, manganese, etc. can be preferably utilized. The photocatalyst particles used in the present invention are, more preferably, anatase-type titanium oxide, rutile-type titanium oxide, zinc oxide, tin oxide, ferric oxide, dibismuth trioxide, tungsten trioxide, and strontium titanate, which may be used in a mixture. As the photocatalyst particles of the present invention, anatase-type titanium oxide can be most preferably utilized.

Although the average particle diameter of the photocatalyst particle of the present invention is not particularly limited, it is preferably 5 nm to 100 nm, more preferably 10 nm to 50 nm. As used herein, "average particle diameter" is measured using a concentrated solution type particle size distribution analyzer utilizing the dynamic light scattering method (FPAR-1000 manufactured by Otsuka Electronics Co., Ltd.). As the measurement method of the average particle size of the present invention, for example, regarding the photocatalyst dispersion adjusted at the solid content of 10 weight %, the cumulant average particle diameter (hydrodynamic diameter) obtained by setting a secondary autocorrelation function which can be directly calculated from the time course of the scattering intensity is used as the average particle diameter. According to a preferred embodiment of the present invention, it is preferable that the ratio of the weight of the photocatalyst particles to the total weight of the coating layer (equivalent to the total solid weight of the coating composition before curing) is 0.1 or less, more preferably 0.05 or less. According to this embodiment, even in the environment where a light including ultraviolet light such as sunlight is applied, the ability to decompose organic substances under irradiation with ultraviolet light can be expected, while preventing predominant occurrence of decomposition reaction of organic substances in the coating layer by the photocatalyst and reducing the deterioration such as chalking. Especially if the weight ratio is 0.05 or less, stability of the member is improved even under a long-term outdoor exposure.

According to a preferred embodiment of the present invention, the coating layer can further contain hydrophilic inorganic particles. According to this embodiment, improvement of hardening property in the coating layer and prevention of microscopic adhesion of the hydrophobic taint can be expected. Preferred examples of the hydrophilic inorganic particles include silica, alumina, zirconia, ceria, and their mixture, more preferably silica. According to a preferred embodiment of the present invention, it is preferable that the ratio of the weight of the hydrophilic inorganic particles to the total weight of the coating layer (equivalent to the total solid weight of the coating composition before curing) is 0.001 to 0.5, more preferably 0.5 or less, further more preferably 0.3 or less. According to this embodiment, by effectively preventing the adhesion of the hydrophobic taint, while preventing the occurrence of cracks due to too much inorganic component contained in the coating layer, improvement of the self-cleaning property can be expected. Although the average particle diameter of the hydrophilic inorganic particle is not particularly limited, it is preferably 3 nm to 100 nm, more preferably 5 nm to 50 nm. As used herein, "average particle diameter" is measured using a concentrated solution type particle size distribution analyzer utilizing the dynamic light scattering method (FPAR-1000 manufactured by Otsuka Electronics Co., Ltd.). As the measurement method of the average particle size of the present invention, for example, regarding the hydrophilic inorganic particle dispersion adjusted at the solid content of 10 weight %, the cumulant average particle diameter (hydrodynamic diameter) obtained by setting a secondary autocorrelation function which can be directly calculated from the time course of the scattering intensity is used as the average particle diameter.

According to a preferred embodiment of the present invention, the coating layer can further contain a color pigment. This makes it possible to impart the design such as coloring and pattern to the appearance. As the color pigment, inorganic pigment, organic pigment, and their mixture are exemplified. Preferred examples of the inorganic pigment include metal oxide such as titanium oxide, zinc flower, colcothar, chromium oxide, cobalt blue, iron black; metal hydroxide such as alumina white and yellow iron oxide; ferrocyanide compound such as iron blue; lead chromate such as chrome yellow, zinc chromate, molybdenum red; sulfide such as zinc sulfide, vermillion, cadmium yellow, cadmium red; selenium compound; sulfate such as barite and precipitated barium sulfate; carbonate such as heavy calcium carbonate and precipitated calcium carbonate; silicate such as hydrous silicate, clay, ultramarine; carbon such as carbon black; metal powder such as aluminum powder, bronze powder, zinc powder; pearl pigment such as mica and titanium oxide; and the like. Preferred examples of the organic pigment include nitroso pigment such as naphthol green B; nitro pigment such as naphthol S; azo pigment such as lithol red, lake red C, fast yellow, naphrol red; condensed polycyclic pigment such as alkali blue red, rhodamine chelate, quinacridone red, dioxadine violet, isoindolinone yellow; and the like.

According to a preferred embodiment of the present invention, it is preferable that the film thickness of the coating layer is 1 μm to 1 mm, more preferably 5 μm to 500 μm. This embodiment prevents the film thickness from becoming smaller than the average particle diameter of the hydrophobic resin emulsion particles and the minor axis of the whisker, a uniform coating layer can be easily formed and cracks are not likely to occur.

Substrate

The substrate used for the self-cleaning member of the present invention is not particularly limited as long as it is a material on which the coating layer is formed. Preferred examples include plastics, metal, glass, ceramics, cement, organic fiber, organic fabrics, coated steel panel, and the like. According to a preferred embodiment of the present invention, it is preferable that the self-cleaning member is used for architectural materials for exterior walls. For example, by forming a coating layer exhibiting the self-cleaning property of the present invention on or above the substrate of the architectural materials for exterior walls, the deposits or contaminants which adhered on the surface can be washed away by raindrops when the surface is exposed to rainfall, or can be washed with water. Furthermore, when the photocatalyst particles are added, further improvement of antifouling property by the ability to decompose organic substances with sunlight irradiation can also be expected. Preferred examples of the substrate of the architectural materials for exterior walls include glazed tile, unglazed tile, bricks, crystallized glass, glass block, concrete, stone, wood; decorative inorganic architectural material of inorganic substrate such as lightweight aerated concrete panel, asbestos cement calcium silicate panel, precast reinforced concrete panel, asbestos slate panel, pulp cement panel, gypsum board, etc., the surface of which is coated with resin paint such as acrylic resin, urethane resin, polyester, silicone, fluorine resin, acrylic silicone resin, etc.; coated steel panel of metal substrate such as aluminum, stainless steel, steel, etc. the surface of which is coated with resin paint such as acrylic resin, urethane resin, polyester, silicone, fluorine resin, acrylic silicone resin, etc.; plastic plate such as acrylic plate, polycarbonate plate or their painted body; and the like.

Coating Composition

The self-cleaning member of the present invention can be produced by applying the coating composition on the surface of the substrate. The coating composition preferably used for this production contains the aforementioned hydrophobic resin emulsion particles, whiskers, dispersant, and various optional components such as photocatalyst particles, hydrophilic inorganic particles, color pigment, etc. as desired. Accordingly, it is considered that, since the hydrophobic resin emulsion particles, highly dispersed in the dispersant are adsorbed on the surface of the whiskers, the hydrophobic resin emulsion particles form a highly three-dimensional crosslinked structure as a linker with the whiskers. In addition, the preferred composition and mixing ratio of each component in the coating composition are as explained above and it is preferable that they are formulated to satisfy the aforementioned preferred solid weight ratio. In addition, although the solid content fraction in the coating composition is not particularly limited, it is preferably 0.1 weight % to 80 weight %, more preferably 10 weight % to 60 weight %.

According to a preferred embodiment of the present invention, water can be preferably used as a dispersant. According to this embodiment, since the high dispersibility of the hydrophobic resin emulsion particles can be maintained, a uniform crosslink structure with whiskers can be formed and there is no adverse effect on the global environment and human body.

According to a preferred embodiment of the present invention, it is possible to add a film-forming agent to the coating composition in order to improve the film-forming property to the substrate. The film-forming agent is an additive having a function to remain in the coated film after most water has vaporized and to enhance fusion among the emulsion particles. Preferred film-forming agent is an organic compound with a boiling point of 100° C. or more. Examples of such organic compound include ethylene based glycol ethers such as ethyleneglycol monomethyl ether, ethyleneglycol monoethyl ether, ethyleneglycol monobuthyl ether, diethyleneglycol monopropyl ether, diethyleneglycol monobutyl ether, diethyleneglycol monohexyl ether, ethyleneglycol ethyl ether acetate, diethyleneglycol monobutyl ether acetate; propylene based glycol ethers such as propyleneglycol monomethyl ether, propyleneglycol monobutyl ether, propyleneglycol monopropyl ether, propyleneglycol monobutyl ether, dipropyleneglycol monomethyl ether, dipropyleneglycol dimethyl ether, dipropyleneglycol monobutyl ether, tripropyleneglycol monomethyl ether, tripropyleneglycol monobutyl ether, polypropyleneglycol monomethyl ether, propyleneglycol monomethyl ether acetate, propyleneglycol diacetate, propyleneglycol phenyl ether; and esters such as 2,2,4-trimethyl-1,3-pentanediol monoisobutyrate, n-pentyl propionate, dibutyl phthalate; and the like. Among these, usage of 2,2,4-trimethyl-1,3-pentanediol monoisobutyrate, which is a kind of esters, is preferable from its high ability to penetrate to fluorine resin emulsion and its high lowering effect of the minimum filming temperature (MFT). Contrarily, usage of ethylene-based glycol ethers is not preferable because of their high toxicity to human body.

The coating composition of the present invention can be produced by uniformly dispersing each raw material in the coating composition. This uniform dispersion can be performed by stirring and mixing using a stirring apparatus such as a dissolver, a disperser, a stirrer, a shaker, and the like.

Method for Producing Self-Cleaning Member

As mentioned above, the self-cleaning composite material of the present invention can be produced by applying the coating composition to the substrate and drying or heating to cure the composition. The film-forming method of the coating composition on or above the substrate is not particularly limited and roller coating, spray coating, bar coating, doctor blade method, dip coating, spin coating, tape molding, casting, etc. can be preferably utilized. According to a preferred embodiment of the present invention, drying and curing of the coated film is possible even at an ambient temperature of about 0° C. to about 40° C. and applying is possible even outdoors and the like. In addition, according to another preferred embodiment of the present invention, the coated film may be heated at 10° C. to 300° C. to dry and cure in order to accelerate hardening of the coated film, after the film was formed according to the aforementioned film-forming method.

According to a preferred embodiment of the present invention, the substrate may be pretreated in order to improve the adhesiveness when the coating layer to the substrate is formed. Preferred examples of the pretreatment include washing, polishing, electropolishing, electric oxidation, sandblasting, etc. In addition, when the coating layer of the present invention is formed on the architectural material substrate for exterior walls, the coating layer may be formed after forming a primer layer by a method such as applying a primer on the substrate, in order to improve the adhesiveness with the substrate.

Embodiment 2: Water Repellent Treatment to the Porous Surface Formed by Anodic Oxidation Treatment According to a preferred embodiment of the present invention, the self-cleaning member can be produced by utilizing the anodic oxidation treatment as the means to form the porous surface, and utilizing the treatment with a water-repellent substance as the means to decrease the surface energy of the surface.

The aforementioned anodic oxidation treatment is a treatment to immerse aluminum as an electrode in an electrolysis vessel containing sulfuric add or oxalic acid solution as an electrolyte bath and to perform electrolysis by direct current or alternative current, to obtain a dense aluminum oxide film of 5 μm to 100 μm thick on the aluminum surface. It is possible to grow the film to the thickness of several mm depending on the condition. Since the oxidized film is dissolved by the ions such as sulfate as it grows depending on the energizing time, the grown aluminum oxide film forms cylindrical fine pores in the order of several nm to several hundred nm on the surface in high density. Generally, opening diameter of fine pores becomes larger depending on the magnitude of the applied voltage and the depth increases depending on the energizing time. Since the surface is porous and has hydroxyl groups exposed in high density, it is very hydrophilic and has high surface energy.

As the substrate for the aforementioned anodic oxidation treatment, valve metal such as titanium, niobium, silicon, etc. can be adopted, besides aluminum substrate.

The aforementioned decrease of the surface energy is to coat the porous substrate surface formed by the anodic oxidation with a water-repellent substance and to control the surface energy of the substrate. As a water-repellent substance applicable to decrease the surface energy, a silane-coupling agent can be utilized.

Embodiment 3: Others

According to a preferred embodiment of the present invention, as the means to produce the self-cleaning member, a porous surface may be formed on a resin substrate which is originally a hydrophobic surface. The means to form the porous surface is not particularly limited, and any means can be utilized. For, example, the porous surface may be formed directly on the resin substrate utilizing a machine processing technique using a drill or an end mill, a laser processing technique using an excimer laser or $CO_2$ laser, and the like. Alternatively, the desired porous structure may be formed on the resin substrate surface utilizing a mold.

As the aforementioned resin substrate, although not particularly limited, a polycarbonate resin, an acrylic resin, a polyacetal resin, an unsaturated polyester resin, a polystyrene resin, a polypropylene resin, and the like are exemplified.

EXAMPLES

The present invention will be explained in more detail by the following examples. However, the present invention is not limited to these examples.

Preparation of the Coating Composition

As the raw materials for the coating composition, the followings were prepared.

Whisker Component
　Potassium titanate whisker: Average short axis of 450 nm, average long axis of 15 μm, aspect ratio=33
　Aluminum borate whisker: Average short axis of 750 nm, average long axis of 20 μm, aspect ratio=27
　Calcium carbonate whisker: Average short axis of 1,000 nm, average long axis of 20 μm, aspect ratio=20
　Rutile-type titanium oxide whisker: Average short axis of 130 nm, average long axis of 1.7 μm, aspect ratio=13
　$TiO_2$ (B)-type titanium oxide whisker: Average short axis of 450 nm, average long axis of 15 μm, aspect ratio=33

Scale-Like Filler Component
　Scale-like talc: Average plate diameter of 5 μm, average thickness of 0.5 μm Aqueous Inorganic Color Pigment Slurry
　Pigment slurry (1): Slurry of titanium oxide pigment powder milled with water in ball mill, solid content of 50%
　Pigment slurry (2): Commercially available aqueous titanium oxide pigment slurry: Solid content of 65%

Hydrophobic Resin Emulsion
　Aqueous silicone resin emulsion (1): Resin content of 50%, average particle diameter (average emulsion size) of 780 nm
　Aqueous silicone resin emulsion (2): Average particle diameter (average emulsion size) of 760 nm, resin content of 50%
　Aqueous silicone resin emulsion (3): Average particle diameter (average emulsion size) of 365 nm, resin content of 50%
　Aqueous silicone resin emulsion (4): Average particle diameter (average emulsion size) of 265 nm, resin content of 50%
　Aqueous fluorine resin emulsion: Average particle diameter (average emulsion size) of 100 nm, resin content of 48%

Silica Sol
　Aqueous colloidal silica sol (1): Average particle diameter of 20 nm, solid content of 50%
　Aqueous colloidal silica sol (2): Average particle diameter of 50 nm, solid content of 40%
　Aqueous colloidal silica sot (3): Average particle diameter of 85 nm, solid content of 40%

Photocatalyst Sol
　Aqueous titanium oxide photocatalyst sol (sol deflocculated with sodium tripolyphosphate as the dispersant): Average particle diameter of 15 nm, solid content of 25%

Silicate-Based Binder
　Alkali metal silicate: lithium silicate, solid content of 24%

Solvent
　Ion exchanged water

Formulation 1

26.2 weight parts of pigment slurry (1), 5.7 weight parts of potassium titanate whisker powder, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.57, Formulation 2

26.2 weight parts of pigment slurry (1), 5.7 weight parts of potassium titanate whisker powder, 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.55.

Formulation 3

26.2 weight parts of pigment slurry (1), 5.7 weight parts of potassium titanate whisker powder, 16 weight parts of aqueous colloidal silica sol (1), 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.46.

Formulation 4

26.2 weight parts of pigment slurry (1), 5.7 weight parts of potassium titanate whisker powder, 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 5

26.2 weight parts of pigment slurry (1), 5.7 weight parts of potassium titanate whisker powder, 16 weight parts of aqueous colloidal silica sol (1), 4.8 weight parts of aqueous photocatalyst sol, 14.4 weight parts of aqueous silicone resin emulsion (2) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 6

26.2 weight parts of pigment slurry (1), 5.7 weight parts of potassium titanate whisker powder, 16 weight parts of aqueous colloidal silica sol (1), 4.8 weight parts of aqueous photocatalyst sol, 14.4 weight parts of aqueous silicone resin emulsion (3) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 7

26.2 weight parts of pigment slurry (1), 5.7 weight parts of potassium titanate whisker powder, 16 weight parts of aqueous colloidal silica sol (1), 4.8 weight parts of aqueous photocatalyst sol, 14.4 weight parts of aqueous silicone resin emulsion (4) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 8

26.2 weight parts of pigment slurry (1), 5.7 weight parts of aluminum borate whisker powder, 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 9

26.2 weight parts of pigment slurry (1), 5.7 weight parts of calcium carbonate whisker powder, 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 10

26.2 weight parts of pigment slurry (1), 5.7 weight parts of rutile-type titanium oxide whisker powder, 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 11

26.2 weight parts of pigment slurry (1), 5.7 weight parts of $TiO_2$ (B)-type whisker powder, 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 12

26.2 weight parts of pigment slurry (1), 2.9 weight parts of potassium titanate whisker powder, 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 4.2. In addition, the weight ratio of the total solid content of the emulsion and the whisker to the total solid content of the coating composition was 0.40.

Formulation 13

26.2 weight parts of pigment slurry (1), 5.7 weight parts of potassium titanate whisker powder, 16 weight parts of aqueous colloidal silica sol (1), 4.8 weight parts of aqueous photocatalyst 48 weight parts of aqueous silicone resin emulsion (4) and 9.6 weight parts of aqueous fluorine resin emulsion were mixed and stirred by a dissolver for 3 hours to obtain the coating composition. The ratio of the solid content of the water repellent emulsion to the whisker was 5.1. In addition, the weight ratio of the total solid content of the emulsion and the whisker to the total solid content of the coating composition was 0.61.

Formulation 14

26.2 weight parts of pigment slurry (1), 5.7 weight parts of potassium titanate whisker powder, 16 weight parts of aqueous colloidal silica sol (1), 4.8 weight parts of aqueous photocatalyst sol and 24 weight parts of aqueous fluorine resin emulsion were mixed and stirred by a dissolver for 3 hours to obtain the coating composition. The ratio of the solid content of the water repellent emulsion to the whisker was 2.1. In addition, the weight ratio of the total solid content of the emulsion and the whisker in the total solid content of the coating composition was 0.44.

Formulation 15

26.2 weight parts of pigment slurry (1), 5.7 weight parts of potassium titanate whisker powder, 16 weight parts of aqueous colloidal silica sol (1), 4.8 weight parts of aqueous photocatalyst sol and 24 weight parts of aqueous silicone resin emulsion (4) were mixed and stirred by a dissolver for 3 hours to obtain the coating composition. The ratio of the solid content of the water repellent emulsion to the whisker was 2.1. In addition, the weight ratio of the total solid content of the emulsion and the whisker to the total solid content of the coating composition was 0.44.

Formulation 16 (Comparison)

26.2 weight parts of pigment slurry (1), 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 0. In addition, the weight ratio of the total solid content of the emulsion and the whisker to the total solid content of the coating composition was 0.35.

Formulation 17 (Comparison)

24.7 weight parts of pigment slurry (2), 7.8 weight parts of potassium titanate whisker powder, 8.2 weight parts of scale-like talc powder, 5.7 weight parts of aqueous photocatalyst sol, 14.7 weight parts of aqueous silicone resin emulsion (1) and 15.3 weight parts of aqueous fluorine resin emulsion were mixed and stirred by a dissolver for 3 hours to obtain the coating composition. The ratio of the solid content of the water repellent emulsion to the whisker was 1.9. In addition, the weight ratio of the total solid content of the emulsion and the whisker to the total solid content of the coating composition was 0.46.

Formulation 18 (Comparison)

56.0 weight parts of pigment slurry (1), 7.0 weight parts of potassium titanate whisker powder, 14 weight parts of aqueous colloidal silica sol (1), 30 weight parts of aqueous photocatalyst sol, 60.2 weight parts of aqueous silicone resin emulsion (1) and 25.8 weight parts of aqueous fluorine resin emulsion were mixed and stirred by a dissolver for 3 hours to obtain the coating composition. The ratio of the solid content of the water repellent emulsion to the whisker was 6.1. In addition, the weight ratio of the total solid content of the emulsion and the whisker to the total solid content of the coating composition was 0.50.

Formulation 19 (Comparison)

26.2 weight parts of pigment slurry (1), 5.7 weight parts of potassium titanate whisker powder, 16 weight parts of aqueous colloidal silica sol (1), 4.8 weight parts of aqueous photocatalyst 57.6 weight parts of aqueous silicone resin emulsion (4) and 9.7 weight parts of aqueous fluorine resin emulsion were mixed and stirred by a dissolver for 3 hours to obtain the coating composition. The ratio of the solid content of the water repellent emulsion to the whisker was 5.9. In addition, the weight ratio of the total solid content of the emulsion and the whisker to the total solid content of the coating composition was 0.63.

Formulation 20 (Comparison)

26.2 weight parts of pigment slurry (1), 5.7 weight parts of potassium titanate whisker powder, 16 weight parts of aqueous colloidal silica sol (1), 4.8 weight parts of aqueous photocatalyst 84.0 weight parts of aqueous silicone resin emulsion (4) and 9.7 weight parts of aqueous fluorine resin emulsion were mixed and stirred by a dissolver for 3 hours to obtain the coating composition. The ratio of the solid content of the water repellent emulsion to the whisker was 8.2. In addition, the weight ratio of the total solid content of the emulsion and the whisker to the total solid content of the coating composition was 0.70.

Formulation 21 (Comparison)

26.2 weight parts of pigment slurry (1), 5.7 weight parts of talc powder, 16 weight parts of aqueous colloidal silica sol (1), 4.8 weight parts of aqueous photocatalyst sol, 14.4 weight parts of aqueous silicone resin emulsion (1) and 9.6 weight parts of aqueous fluorine resin emulsion were mixed and stirred by a dissolver for 3 hours to obtain the coating composition. The ratio of the solid content of the water repellent emulsion to the whisker was 0. In addition, the weight ratio of the total solid content of the emulsion and the whisker to the total solid content of the coating composition was 0.35.

Formulation 22 (Comparison)

In order to make a photocatalytic superhydrophilic coated film, 100 weight parts of aqueous photocatalyst sol was used as the coating composition.

Formulation 23 (Comparison),

To 98.8 weight parts of ion exchanged water, 0.25 weight parts of aqueous colloidal silica sol (1), 0.30 weight parts of aqueous colloidal silica sol (2), 0.25 weight parts of aqueous colloidal silica sol (3) and 0.40 weight parts of alkali metal silicate were added and stirred by a stirrer for 1 hour to obtain the coating composition.

Formulation 24 (Comparison)

A commercially available acrylic hydrophilic coating agent which forms a flat and transparent film having a surface with a contact angle of water of less than 10 degree.

Formulation 25 (Comparison)

A commercially available acrylic silicone water repellent coating agent which forms a flat and transparent film having a surface with a contact angle of water of more than 90 degree.

Preparation of Examples 1 to 15 and Comparison Examples 1 to 7

For each coating composition described in Formulations 1 to 21, on the both longer sides of a surface of an aluminum plate cut into 50 mm×100 mm, pieces of mending tape (tape thickness 63 µm) manufactured by Sumitomo 3M K.K. were pasted each with a width of 5 mm. The plate was coated with the coating composition with an applicator and dried and cured at a temperature of 23° C. and a humidity of 50% RH for 1 week to make the. composite material sample having 40 mm×100 mm. The average value of the film thickness of arbitrary 5 points at the fracture surface obtained by a scanning electron microscopic observation was about 30 µm for each sample. Each of the composite material samples obtained from the coating compositions described in Formulations 1 to 15 was referred to as Example 1 to 15. Each of the composite material samples obtained from the coating compositions described in Formulations 16 to 21 was referred to as Comparison Example 1 to 6.

Preparation of Comparison Example 7

For the coating composition described in Formulation 22, an aluminum plate cut into 50 mm×100 mm was coated by dropping 1 ml of the coating composition and rotated at 2,000 rpm for 10 seconds by a spin coater, followed by drying and curing at a temperature of 23° C. and a humidity of 50% RH for 1 week, to make the composite material sample having 50 mm×100 mm, which was referred to as Comparison Example 7. The average value of the film thickness of arbitrary 5 points at the fracture surface obtained by a scanning electron microscopic observation was about 1 μm for each sample.

Preparation of Comparison Example 8

For the coating composition described in Formulation 23, a soda glass plate cut into 50 mm×100 mm was flow-coated, dried at a temperature of 23° C. and a humidity of 50% RH for 16 hours, and calcined in air at 300° C. for 30 minutes to produce the composite material sample referred to as Comparison Example 8.

Preparation of Comparison Example 9

For the coating agent described in Formulation 24, a soda glass plate cut into 50 mm×100 mm was flow-coated to produce the composite material sample referred to as Comparison Example 9.

Preparation of Comparison Example 10

For the coating agent described in Formulation 25, a soda glass plate cut into 50 mm×100 mm was flow-coated, dried at a temperature of 23° C. and a humidity of 50% RH for 16 hours, and calcined in air at 150° C. for 2 hours to produce the composite material sample referred to as Comparison Example 10.

Preparation of Example 16

An aluminum plate cut into 30 mm×60 mm was energized at 100 V for 2 minutes in a 2.7% oxalic acid bath, and then immersed in 5 aqueous phosphoric acid solution for 1 hour. After washing with distilled water and drying in air at 80° C. for 1 hour, the aluminum plate was immersed in a 0.1% toluene solution of octadecyltriethoxysilane at 50° C. for 4 hours, and after washing with toluene and ethanol, dried in air at 80° C. for 1 hour to produce the composite material sample, referred to as Example 17. TM surface image observed with a scanning electron microscope was porous and the cylindrical fine pores with an opening pore diameter of about 0.1 μm occupied 50% in the area ratio relative to the whole visual field. In addition, the depth of the cylindrical pore obtained from the cross-sectional observation image was about 2 μm.

Evaluation 1: Measurement of Dynamic Contact Angle

For the each surface of Examples 1 to 16 and Comparison Examples of 1 to 10, the advancing contact angle, receding contact angle and contact angle hysteresis of the water drop on the surface were measured by an extension/contraction method using an automatic contact angle measuring instrument (OCA20) manufactured by Eko Instruments Co. Ltd. As the conditions of the measurement of the dynamic contact angle by the extension/contraction method in the present invention, injection-aspiration speed of the water drop to be grown and contracted on the substrate was 20 μL/s and the maximum injection amount was 40 μL. In addition, a 500 μL syringe (DS500/GT manufactured by Hamilton Co.) was used to inject the water drop and a stainless-steel needle of an outer diameter of 0.1 mm and a bore diameter of 0.05 mm, with a 90 degree cut end (SNS021/011 manufactured by Data Physics Corporation) was used as a needle to be connected to the syringe. The results are shown in Table 1.

Evaluation 2: Weather Resistance Test

For the member of Example 4, an accelerated weather resistance test was performed according to JIS K 5400 9.8 "Accelerated weathering test-Sunshine carbon-arc type weathering test". The water contact angle was evaluated by the dynamic contact angle measurement described in Evaluation 1, after a 150-hour acceleration test which is equivalent to a 6-month exposure. As a result, it was found that θa=123.7 degree, θr=19.6 degree, Δθ=104.1 degree, showing that the initial wetability was retained after the weather resistance test.

Evaluation 3; Anti-Carbon Stain Property Test

For the members of the Examples 1 to 16 and Comparison Examples 1 to 10, a water dispersion of hydrophobic carbon black (solid content 1%) was sprayed onto the aforementioned member surface 10 times using an atomizer and the member was dried at a temperature of 23° C. and a humidity of 50% RH for 2 hours. Anti-carbon stain property was evaluated by visual observation of the 1.5 degree of carbon adhesion on the coated film surface after drying. The evaluation index of the test was as follows.

A: Trace of carbon adhesion was not at all conspicuous.
B: Carbon adhesion was little conspicuous.
C: Carbon adhesion was conspicuous.

The results are shown in Table 1.

Evaluation 4: Anti-Rust Stain Property Test

A primer-coated aluminum plate was coated with the coating composition of each formulation of Formulations 1 to 22 and dried at room temperature for 1 week. An iron nail (4 cm long), the surface of which had been oxidized by immersing in aqueous 1% nitric acid solution for 1 hour beforehand, was attached to each sample obtained above and each of the samples was exposed outdoors (Chigasakl City, Kanagawa Prefecture) for 2 months. After exposure, adhesion degree of the rust, which was generated and flowed down the coated surface, was visually assessed. The evaluation index of the test was as follows.

A: Trace of rust adhesion was not at all conspicuous.
B: Rust adhesion was little conspicuous.
C: Rust adhesion was conspicuous.

The results are shown in Table 1.

Evaluation 5: Measurement of Size and Number Density of Fine Pores

The porous surface of Examples 1, 4, 9 and 10 was observed with a three-dimensional laser microscope (VF8710 manufactured by Keyence Corporation) and the size and the number density of the fine pores were calculated by using a particle (circle) shape analysis function. Independent fine pores of a diameter of 5 μm to 30 μm converted to circle were observed in a density of 917, 348, 312 and 220 holes per $mm^2$, respectively. On the other hand, in Comparison Example 2, independent fine pores of a diameter of 5 μm to 30 μm converted to circle were observed in a density of 91 holes per $mm^2$.

Evaluation 6: Measurement of Static Contact Angle of Water

The static contact angle of water on the surface of Examples 1 to 16 and Comparison Examples 1 to 10 was measured by Sessile drop method, applying a 5 μL water drop using an automatic contact angle measuring instrument (OCA20) manufactured by Eko Instruments Co., Ltd. The value obtained by settling still for 30 seconds after applying the water drop was referred to as the static contact angle. The results are shown in Table 1. As a result, it was confirmed that the surface of each member measured, except Comparison Examples 7, 8 and 9, had a contact angle of water of 80 to 130 degree.

property by spraying distilled water, as well as by Evaluation 3: Anti-Carbon stain property test. The evaluation index of the test was as follows.

TABLE 1

| | Coating Composition | | Evaluation 1: Dynamic contact angle | | | Evaluation 6: Static contact angle θ (degree) | Evaluation 3: Carbon adherability | Evaluation 4: Rust adherability |
|---|---|---|---|---|---|---|---|---|
| | Whisker + Emulsion Solid Content Ratio | Emulsion/ Whisker Ratio | θa (degree) | θr (degree) | Δθ (degree) | | | |
| Example 1 | 0.57 | 2.1 | 98.8 | 16.8 | 82.0 | 100 | B | A |
| Example 2 | 0.55 | 2.1 | 100.5 | 15.4 | 85.1 | 108 | B | B |
| Example 3 | 0.46 | 2.1 | 102.6 | 9.5 | 93.1 | 110 | B | A |
| Example 4 | 0.44 | 2.1 | 116.1 | 20.8 | 95.3 | 116 | B | B |
| Example 5 | 0.44 | 2.1 | 126.1 | 14.2 | 111.9 | 120 | B | A |
| Example 6 | 0.44 | 2.1 | 97.2 | 9.5 | 87.7 | 96 | B | A |
| Example 7 | 0.44 | 2.1 | 101.4 | 9.7 | 91.7 | 100 | B | A |
| Example 8 | 0.44 | 2.1 | 105.1 | 7.5 | 97.6 | 92 | B | B |
| Example 9 | 0.44 | 2.1 | 112.7 | 12.9 | 99.8 | 98 | A | B |
| Example 10 | 0.44 | 2.1 | 119.5 | 14.3 | 105.2 | 110 | A | B |
| Example 11 | 0.44 | 2.1 | 116.7 | 11.5 | 105.2 | 101 | B | B |
| Example 12 | 0.40 | 4.2 | 115.9 | 15.4 | 100.5 | 108 | B | A |
| Example 13 | 0.61 | 5.1 | 89.4 | 9.0 | 80.4 | 81 | B | A |
| Example 14 | 0.44 | 2.1 | 94.1 | 8.8 | 85.3 | 90 | A | B |
| Example 15 | 0.44 | 2.1 | 124.6 | 15.8 | 108.8 | 95 | B | B |
| Example 16 | — | — | 105.9 | 8.1 | 97.8 | 102 | A | |
| Comparison Example 1 | 0.35 | 0 | 111.8 | 33.3 | 78.5 | 88 | C | B |
| Comparison Example 2 | 0.46 | 1.9 | 101.6 | 40.1 | 61.5 | 114 | C | C |
| Comparison Example 3 | 0.50 | 6.1 | 106.6 | 39.4 | 67.2 | 101 | C | C |
| Comparison Example 4 | 0.63 | 5.9 | 92.4 | 12.5 | 79.9 | 99 | C | B |
| Comparison Example 5 | 0.70 | 8.2 | 83.1 | 15.3 | 67.8 | 90 | C | B |
| Comparison Example 6 | 0.35 | 0 | 94.5 | 15.2 | 79.3 | 85 | C | B |
| Comparison Example 7 | 0 | 0 | 24.5 | 15.1 | 10.4 | 20 | B | C |
| Comparison Example 8 | — | — | 52.7 | 6.1 | 46.6 | 24 | B | |
| Comparison Example 9 | — | — | 16.5 | 0 | 16.5 | 8 | A | |
| Comparison Example 10 | — | — | 103.5 | 90.1 | 13.4 | 103 | C | |

Evaluation 7: Anti-Water Stain Property Test

For the member surface of Examples 1, 3, 4, 8 and 16 and Comparison Examples 2, 8, 9 and 10, the degree of contamination by water stain adhesion after repeating tap water spraying and drying for 2 months was evaluated by visual observation. The evaluation index of the test is as follows.
A: Almost no change of the member surface was observed compared with the surface at the initiation of the test.
C: Ring-shaped or streaky water stain formation was observed on the member surface.
The results are shown in Table 2.

Evaluation 8: Anti-Silicone Sealant Stain Property Test

Two samples each of the composite material of Examples 3, 4, 8 and 16 and Comparison Examples of 1, 8, 9 and 10 were fixed at an interval of 0.5 cm and one-pack type silicone sealant (Cemedine 8000) was injected between the samples. After injection of the sealant, the samples were dried at a temperature of 25° C. and a humidity of 50% RH for 16 hours, followed by 5 times repeating of spraying distilled water by an atomizer and drying for 2 hours. The degree of the surface contamination due to the hydrophobic component migrating from the silicone sealant was assessed by water film forming property by spraying distilled water, as well as by Evaluation 3: Anti-Carbon stain property test. The evaluation index of the test was as follows.

Water Film Forming Property
A: Water film was formed on the whole surface of the member.
B: Part of the surface of the member repelled water.
C: The whole surface of the member repelled water.

Carbon Adherability
A: Trance of carbon adhesion was not at all conspicuous.
B: Carbon adhesion was little conspicuous.
C: Carbon adhesion was conspicuous.
The results are shown in Table 2.

TABLE 2

| | Evaluation 7: Anti-water stain property | Evaluation 8: Anti-silicone sealant stain property | |
|---|---|---|---|
| | | Water film forming property | Carbon adherability |
| Example 1 | A | | |
| Example 2 | | | |
| Example 3 | A | A | A |

TABLE 2-continued

| | Evaluation 7: Anti-water stain property | Evaluation 8: Anti-silicone sealant stain property | |
| --- | --- | --- | --- |
| | | Water film forming property | Carbon adherability |
| Example 4 | A | A | A |
| Example 5 | | | |
| Example 6 | | | |
| Example 7 | | | |
| Example 8 | A | A | A |
| Example 9 | | | |
| Example 10 | | | |
| Example 11 | | | |
| Example 12 | | | |
| Example 13 | | | |
| Example 14 | | | |
| Example 15 | | | |
| Example 16 | A | A | A |
| Comparison Example 1 | | C | C |
| Comparison Example 2 | C | | |
| Comparison Example 3 | | | |
| Comparison Example 4 | | | |
| Comparison Example 5 | | | |
| Comparison Example 6 | | | |
| Comparison Example 7 | | | |
| Comparison Example 8 | C | B | C |
| Comparison Example 9 | C | C | C |
| Comparison Example 10 | C | C | C |

As seen from the aforementioned results, it is concluded that the composite material having the contact angle hysteresis $\Delta\theta$ ($=\theta a-\theta r$) of 80 degree or more has an excellent contamination resistance even against the hydrophobic taint by carbon black and ionic contaminant or reactive contaminant such as iron rust taint, water stain or silicone sealant taint. In addition, as a result of the sunshine carbon arc-type weathering test, it has been revealed that this composite material maintains the aforementioned characteristics even after treatment that is equivalent to a 6-month outdoor exposure and is a member excellent in weather resistance.

What is claimed is:

1. A self-cleaning member comprising a substrate and a coating layer having a porous surface provided on or above the substrate, the coating layer comprising a hydrophobic resin, and whiskers,
    wherein the porous surface has a contact angle hysteresis $\Delta\theta$ ($=\theta a-\theta r$), which is a difference between an advancing contact angle $\theta a$ and a receding contact angle $\theta r$ measured by dynamic contact angle measurement by an extension/contraction method, of 80 degrees or more and a receding contact angle of 25 degrees or less, has a static contact angle of water of 80 degrees to 130 degrees,
    wherein a weight ratio of the hydrophobic resin to the whisker in the coating layer is 2 or more to 5.5 or less,
    a ratio of a sum of the solid weight of the hydrophobic resin and the whiskers to the total solid weight of the coating layer is 0.4 or more to 1.0, and
    wherein the coating layer does not contain photocatalyst particles.

2. The self-cleaning member according to claim 1, wherein the porous surface has an opening pore diameter of 10 nm or more and 30 μm or less.

3. The self-cleaning member according to claim 1, wherein an aspect ratio represented by long axis/short axis of the whiskers is 5 to 100.

4. The self-cleaning member according to claim 1, wherein the whisker is at least one whisker selected from the group consisting of potassium titanate, calcium carbonate, sepiolite, wollastonite, titanium oxide, zinc oxide and aluminum borate.

5. The self-cleaning member according to claim 1, wherein the coating layer further contains hydrophilic inorganic particles.

6. The self-cleaning member according to claim 5, wherein the hydrophilic inorganic particles are at least one selected from the group consisting of silica, alumina, zirconia and ceria.

7. The self-cleaning member according to claim 5, wherein the ratio of the weight of the hydrophilic inorganic particles to the total weight of the coating layer is 0.001 to 0.5.

8. The self-cleaning member according to claim 1, wherein fine pores of a diameter of about 5 μm to about 30 μm are formed on the coating layer at a density of 200 pores/mm$^2$ or more.

9. The self-cleaning member according to claim 1, utilized as the architectural material for exterior wall.

10. A coating layer having a porous surface and comprising a hydrophobic resin and whiskers,
    wherein the porous surface has a contact angle hysteresis $\Delta\theta$ ($=\theta a-\theta r$), which is a difference between an advancing contact angle $\theta a$ and a receding contact angle $\theta r$ measured by dynamic contact angle measurement by an extension/contraction method, of 80 degrees or more and a receding contact angle of 25 degrees or less, has a static contact angle of water of 80 degrees to 130 degrees,
    wherein a weight ratio of the hydrophobic resin to the whiskers in the coating composition is 2 or more to 5.5 or less,
    a ratio of a sum of the solid weight of the hydrophobic resin and the whiskers to the total solid weight of the coating layer is 0.4 or more to 1.0, and
    wherein the coating layer does not contain photocatalyst particles.

11. The coating layer according to claim 10, wherein the hydrophobic resin emulsion particles are at least one selected from the group consisting of silicone resin emulsion particles and fluorine resin emulsion particles.

12. The coating layer according to claim 10, wherein the average particle diameter of the hydrophobic resin emulsion particles is 80 nm to 2,000 nm.

13. The coating layer according to claim 10, wherein an aspect ratio represented by long axis/short axis of the whiskers is 5 to 100.

14. The coating layer according to claim 10, wherein the short axis of the whiskers is 50 nm to 2,000 nm.

15. The coating layer according to claim 10, wherein the ratio of the average short axis of the whiskers to the average particle diameter of the hydrophobic resin emulsion particles is 0.1 to 5.

16. The coating layer according to claim 10, wherein the whiskers are at least one whisker selected from the group consisting of potassium titanate, calcium carbonate, sepiolite, wollastonite, titanium oxide, zinc oxide and aluminum borate.

17. The coating layer according to claim 10, wherein a weight ratio of the solid content of the hydrophobic resin particles to the whiskers in the coating composition is 2 or more and 5 or less.

18. The coating layer according to claim 10, further containing hydrophilic inorganic particles.

19. The coating layer according to claim 18, wherein the hydrophilic inorganic particles are at least one selected from the group consisting of silica, alumina, zirconia and ceria.

20. The coating layer according to claim 18, wherein the weight ratio of the hydrophilic inorganic particles to the solid content of the coating layer is 0.001 to 0.5.

* * * * *